United States Patent

[11] 3,562,556

[72] Inventors Donald Robert Barber
Bishop's Stortford;
Michael John Gingell, Harlow, England

[21] Appl No 605,949
[22] Filed Dec. 9, 1966
[45] Patented Feb. 9, 1971
[73] Assignee International Standard Electric Corporation
New York, N.Y.
a corporation of Delaware
[32] Priority Dec. 9, 1965
[33] Great Britain
[31] 52293/65

[54] N-PATH FREQUENCY TRANSLATION SYSTEM
15 Claims, 10 Drawing Figs.

[52] U.S. Cl. ........ 307/295, 307/240, 307/242, 328/15, 328/167, 332/23
[51] Int. Cl. ........ H03k 1/16
[50] Field of Search ........ 328/15, 163.4, 167; 332/23; 179/15BWR

[56] References Cited

UNITED STATES PATENTS

| | | | |
|---|---|---|---|
| 3,081,434 | 3/1963 | Sandberg | 328/167X |
| 3,159,720 | 12/1964 | Bergmann et al. | 179/15X |
| 3,403,345 | 9/1968 | Frank et al. | 328/163X |

*Primary Examiner*—Donald D. Forrer
*Assistant Examiner*—John Zazworsky
*Attorneys*—C. Cornell Remsen, Jr., Rayson P. Morris, Percy P. Lantzy, J. Warren Whitesel, Phillip A. Weiss and Delbert P. Warner

ABSTRACT: The invention provides a frequency translation system having N-paths which are identical and connected in parallel. Each of the paths includes at least one input modulator unit, a filter unit and at least one output modulator unit. The modulator units sample in turn a given input frequency spectrum for a set period of time determined by the number of paths N. The input and output modulator units are unbalanced. The output of each of the paths is connected to a summation unit to produce output frequency spectrums which are either an erect or inverted translation of the input frequency spectrum.

D. R. BARBER
M. J. GINGELL
Inventor
By
Attorney

N-PATH FREQUENCY TRANSLATION SYSTEM

The invention relates to an N-path frequency translation system.

The invention provides a frequency translation system having N-paths which are identical and connected in parallel, each of said paths which comprises at least one input modulator unit, a filter unit and at least one input modulator unit, a filter unit and at least one output modulator unit sample in turn, a given input frequency spectrum for a period of time determined by N, said input and output modulator units being unbalanced, the outputs of each of said paths being connected to a summation unit the output frequency spectrums of which are either an erect or inverted translation of said input frequency spectrum.

According to one feature of the invention a frequency translation system as detailed in the preceding paragraph is provided wherein said input frequency spectrum is band limited by providing a second filter unit which is interposed between said input and said input modulator unit.

According to another feature of the invention a frequency translation system as detailed in the preceding paragraphs is provided wherein N is determined by said output frequency spectrum bandwidth.

The foregoing and other features according to the invention will be understood from the following description with reference to the accompanying drawings in which.

Figure 1:
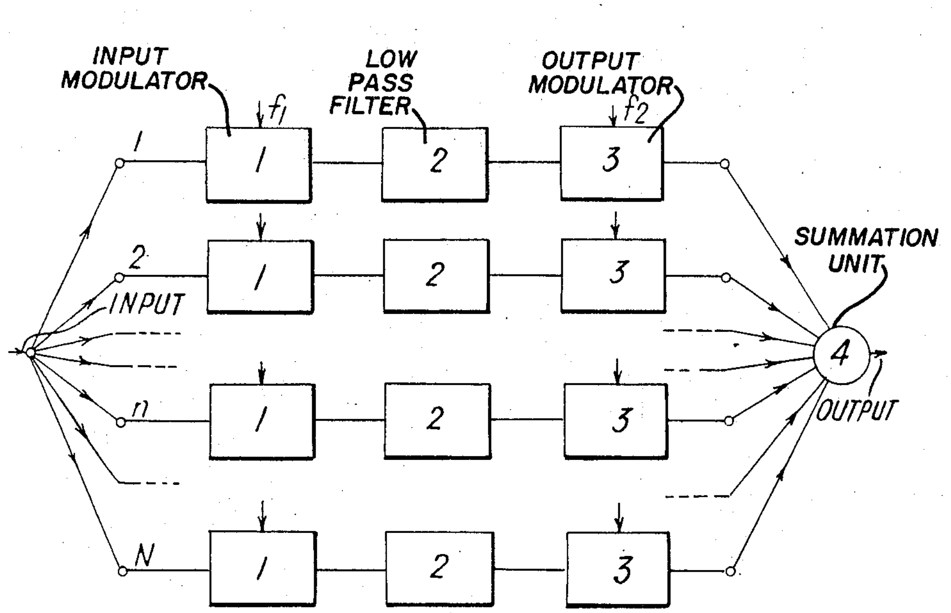
FIG. 1 shows a block diagram of the N-path configuration of a frequency translation system.

Referring to FIG. 1 a block diagram of the N-path configuration of a frequency translation system is shown, each path of which comprises a modulator unit 1 at a frequency $f_1$ which is the midband frequency of the input band of frequencies, a low pass filter unit 2 whose cutoff frequency is half the desired system bandwidth and a second modulator unit 3 at a frequency $f_2$ which is the midband frequency of the output band frequencies. The modulator units 1 and 3 being unbalanced.

This system is arranged to select a band of frequencies from a given input spectrum and to translate it either erect or inverted to a new frequency band, i.e., the output frequency band as obtained from the summation unit 4.

Considering only one path of the N-path system, the output signal is sampled by and passed through the input modulator unit 1. This modulator unit has a square wave signal applied to it so there will be a large number of frequency components appearing in the output circuit of the input modulator unit 1 but the only one of interest is the difference frequency between the input and modulator frequencies. Thus, the output from the low pass filter unit 2 will be a single low frequency signal which is demodulated by the output modulator unit 3 before being passed to the summation unit 4.

All of the N-paths are physically identical. The input modulator waveforms are identical, the only difference being that each is delayed from the previous one by $T_{1/N}$ where $T_1$ is the period of $f_1$. Similarly for the output modulators where the delay is $T_{2/N}$.

Figure 2:
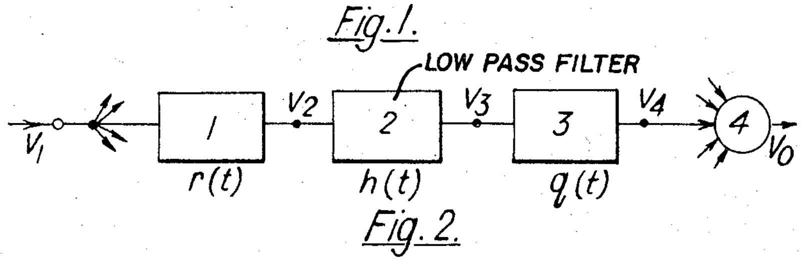
FIG. 2 shows a block diagram of the $n^{th}$-path of the frequency translation system shown in the drawing according to FIG. 1.

FIG. 2 shows a block diagram of the $n^{th}$ path of the system shown in the drawing according to FIG. 1, the input signal to the modulator unit 1 being represented as a voltage $V_1$ and the output signal as $V_2$ which is also the input signal to the low pass filter unit 2. The output from the low pass filter unit 2 which is the input to the modulator unit 2 being represented as a voltage $V_3$ and the output from the modulator unit 3 (input to summation unit 4) being represented as a voltage $V_4$. The output of the system being represented by $V_0$.

The transfer function of each of the units may be expressed as a function of time ($t$) in terms of the input and output voltages as follows:

$$V_2(t)=V_1(t)\times r(t) \qquad (1)$$

$$V_3(t)=h(t)\times V_2(t) \qquad (2)$$

$$V4(t)=V_3(t)\times q(t) \qquad (3)$$

where $r(t)$ is the transfer function of the modulator unit 1

$h(t)$ is the transfer function of the low pass filter unit 2

$q(t)$ is the transfer function of the modulator unit 3.

The modulating or switching functions are defined by the Fourier Series $$r(t)=\sum_{L=-\infty}^{L=+\infty} R_L e^{j\omega 1Lt} \qquad (4)$$

$$R_L=\frac{1}{T}\int_{-T_{1/2}}^{T_{1/2}} r(t)e^{-j\omega 1Lt}dt \qquad (5)$$

$$\omega_1=2\pi f_1=2\pi/_{T1} \qquad (6)$$

$$q(t)=\sum_{K=-\infty}^{K=+\infty} Q_K e^{j\omega 2Kt} \qquad (7)$$

$$Q_K=\frac{1}{T_2}\int_{-T_{2/2}}^{+T_{2/2}} q(t)e^{-j\omega 2Lt}dt \qquad (8)$$

$$\omega_2=2\pi f_2=2\pi/_{T2} \qquad (9)$$

where $R_L$ is the Fourier coefficient of $L^{th}$ term in expansion of input modulator switching functions.

$\omega_1=2\pi f_1$, i.e., angular rotation speed of input modulator $\omega_2=2\pi f2$, i.e., angular rotation speed of output modulator $Q_K$ is the Fourier coefficient of $L^{th}$ term in expansion of output modulator switching function.

$T_1$ is the period of the switching function of input modulator $T_2$ is the period of the switching function of output modulator.

From equations (1) and (4)

$$V_2(t)=V_1(t)\sum_{L=-\infty}^{L=+\infty} R_L e^{j\omega 1Lt} \qquad (10)$$

Taking the Laplace Transform of Equation 10 we have $$V_2(p)=\sum_{L=-\infty}^{L=+\infty} R_L V_1(p-Lp_1) \qquad (11)$$

where:

$p$ = the complex variable $j\omega$ $p_1$ = the complex variable $j\omega_1$

Hence:

$$V_3(p)=\sum_{L=-\infty}^{L=+\infty} R_L H(p-Lp_1)V_1(p-Lp_1) \qquad (12)$$

where H($p$) is the Laplace Transform of the transfer function $h(p)$ of the low pass filter unit And $V_4(p) \sum_{L=-\infty}^{L=+\infty}\sum_{K=-\infty}^{K=+\infty} R_L Q_K H(p-Lp_1)V_1$ $$(p-Lp_1-Kp_2) \quad (13)$$

where $p_2=$ the complex variable $j\omega_2$

Finally $$V_0(p)=\sum_{n=1}^{n=N} V_4(p)= \quad (14)$$

Considering the general term in the output spectrum of $V_0(p)$ i.e. $$\sum_{n=1}^{n=N} R_L Q_K H(p-Lp_1)V_1(p-Lp_1-Kp_2) \quad (15)$$

Figure 3:
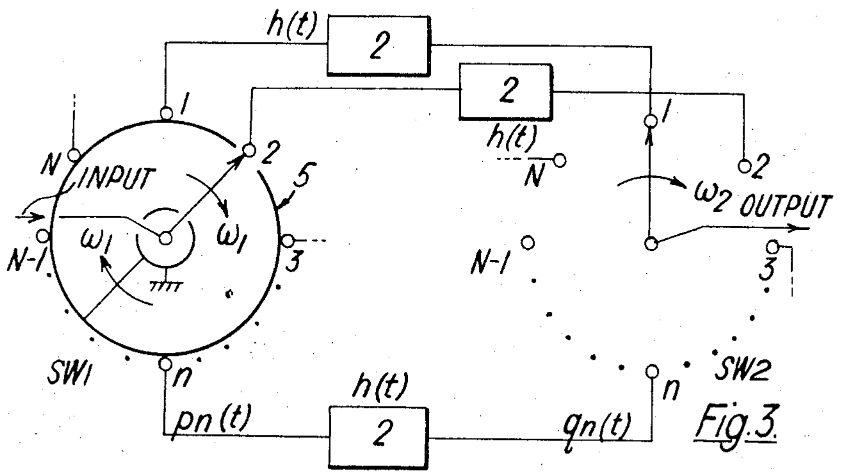
FIG. 3 shows a block diagram of a practical circuit for realization of the N-path configuration of the frequency translation system shown in the drawing according to FIG. 1.

Referring to FIG. 3, a block diagram of a practical circuit for realization of the N-path configuration of a frequency translation system is shown, the two modulators in each path being replaced by rotary sampling switches SW1 and SW2.

It should be noted that to define the modulator conditions the input modulator has a shorting ring 5 which rotates in synchronism with the switch and earths the inputs to all the low pass filter units 2 except the one which makes contact with the input switch SW1.

Figure 4:
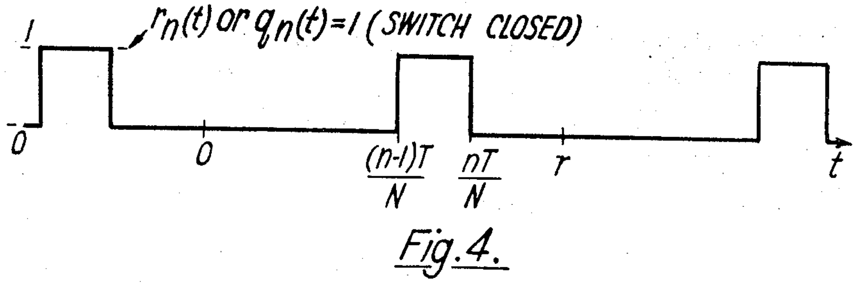
FIG. 4 shows a waveform which expresses the function of the modulator shown in the drawing according to FIG. 3.

If the dwell time on each contact is T/N where N is the number of paths, and T is the time for one switch revolution then the modulator function can be expressed as shown in FIG. 4.

Then $$R_L=\frac{1}{T_1}\int_{-T_1/2}^{+T_1/2} e^{-j\omega_1 Lt} r(t)dt \quad (17)$$

$$=\left[\frac{e^{-j\omega_1 Lt}}{-j\omega_1 LT_1}\right]_{\frac{n-1}{N}T_1}^{\frac{n}{N}T_1} \quad (18)$$

$$=\frac{\sin\frac{\pi L}{N}}{\pi L} e^{-j\pi L\left(\frac{2n-1}{N}\right)} \quad (19)$$

$$X_L=\frac{\sin\frac{\pi L}{(N)}}{\pi L} \quad (20)$$

$$R_L=X_L e^{-j\pi L\left(\frac{2n-1}{N}\right)} \quad (21)$$

$$Q_K=X_K e^{-j\pi K\left(\frac{2n-1}{N}\right)} \quad (22)$$

$$\sum_{n=1}^{n=N} R_L Q_K=X_L X_K\sum_{n=1}^{n=N} e^{-j\pi\left[\frac{(2n-1)(K+L)}{N}\right]} \quad (23)$$

$$\sum_{n=1}^{n=N} R_L Q_K=X_L X_K\sum_{n=1}^{n=N} e^{-j\pi m(2n-1)} \quad (24)$$

$$\sum_{n=1}^{n=N} e^{-j\pi m(2n-1)}$$

$$=e^{-j\pi m}+e^{-j3\pi m}+e^{-j5\pi m}+\ldots+e^{-j\pi m(2N-1)}$$

$$=(-1)^m N \text{ if } K+L=mN$$

$$\text{If } K+L\neq mN \text{ then } \Sigma=0$$

$$V_{o(p)}=N\sum_{1,L,K}(-1)^m X_L X_K H(p-Lp_1)V_1$$

$$[p-Lp_1-(mN-L)p_2] \quad (25)$$

With certain band limiting restrictions on the input and output the only case of interest is when $$m=o \quad L=l \quad K=-l$$

and in this case $$Vo(p)=NX_1 X_{-1} H(p-p_1) V_1(p-p_1=p_2) \quad (26)$$

$$=\frac{N_2}{\pi}\sin^2\left(\frac{\pi}{N}\right) H(p-p_1)V_1(p-p_1+p_2) \quad (27)$$

This is the original band translated from $$(f_1-f_o)<f_{in}<(f_1+f_o) \text{ to } (f_2-f_o)<f_{out}\ll(f_2+f_o)$$

i.e. the "upper sideband" where $f_2$ is the low pass filter cutoff frequency = half the system bandwidth.

The band limiting restrictions depend on the number of paths and the width of the band that it is desired to translate.

Considering equation 25 the two bands which are generated at the output and which are nearest to the desired output band are those for L = 0, K = 0, and L = 1, K = N−1. This is shown in the drawing according to FIG. 5 which illustrates part of the output spectrum of the frequency translation system.

Figure 5:
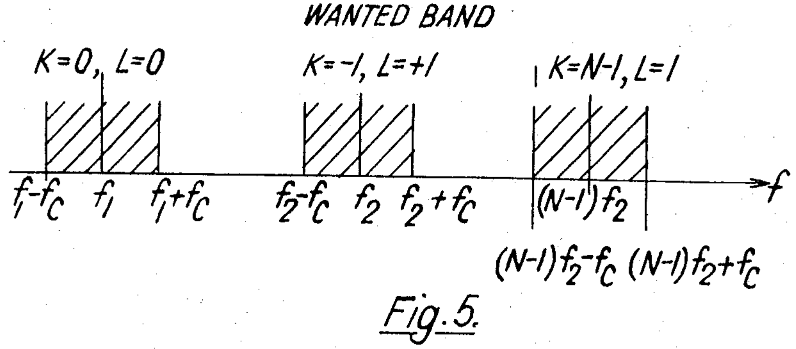
FIG. 5 shows part of the output spectrum of a frequency translation system.

Hence from FIG. 5.

$$f_1+f_o\ll f_2-f_o \text{ or } f_o\ll f_2-f_1 \quad (28)$$

$$\text{Also } (N-1)f_2-f_o>f_2+f_o \therefore N>2(1+f_o/f_2) \quad (29)$$

The output from the system must therefore be band limited with a band pass filter unit such that $$f_1+f_c<f<(N-1)f_2-f_c$$

To obtain the "lower sideband," i.e., the original band translated and inverted it is only necessary to reverse the direction of rotation of one of the modulator rotary switches SW1 and SW2 shown in the drawing according to FIG. 3.

For example, if the direction of rotation of the modulator rotary switch SW1 shown in the drawing according to FIG. 3 were reversed then $$R_L=X_L e^{-j\pi L}\left[\frac{2N-(2n-1)}{N}\right] \quad (30)$$

and if $K-L=mN$ the $\sum_{n=1}^{n=N} R_L Q_K=(-1)^m N X_L X_K$ (31)

otherwise it will equal zero.

Hence again with band limiting restrictions we have $$V_o(p)=NX_1^2 H(p-p_1)V_1(p-p_1-p_2)$$

$$=-\frac{N_2}{\pi}\sin^2\left(\frac{\pi}{N}\right) H(p-p_1)V_1(p_1+p_2-p) \quad (32)$$

which is the original band translated and inverted.

This is a very useful facility. As an example consider the case where the input band extends from zero to $2f_1$, i.e., an "audio" input, it is then possible to generate either the upper or lower sideband centered on $f_2$ with the same equipment. The process is, of course, reversible.

Figure 6:
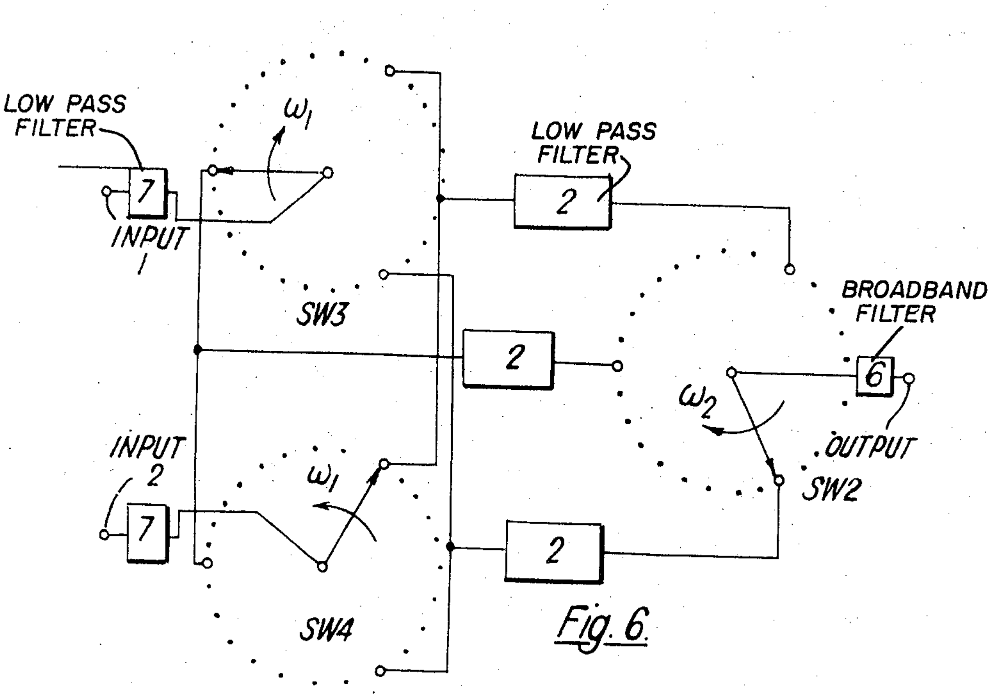
FIG. 6 shows a block diagram of a practical circuit for realization of a three path configuration for a frequency translation with two input modulators.
Figures 7, 9:
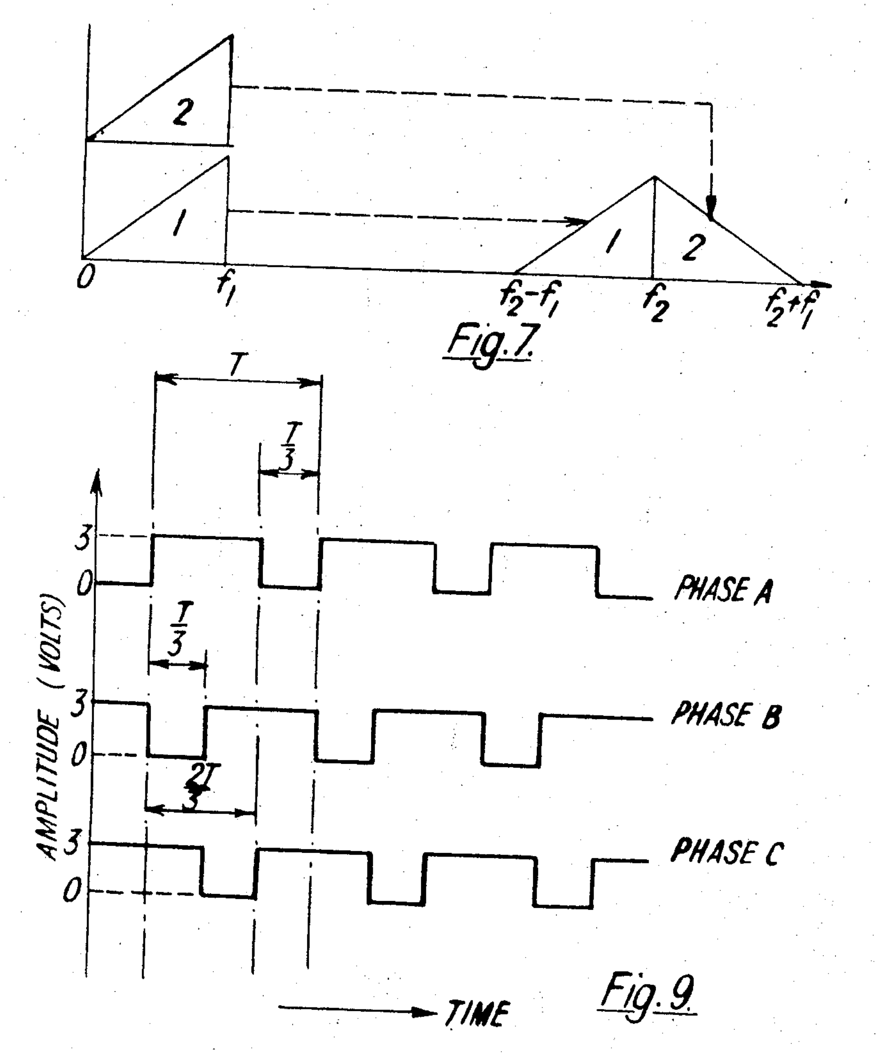
FIG. 7 shows the translated frequency spectrum for the system in the drawing according to FIG. 6.
FIG. 9 shows the waveforms of each of the input signals to the three input modulator circuits shown in the drawing according to FIG. 8.

As a further example, the input modulator units can be duplicated so that there are two inputs as shown in the drawing according to FIG. 6. The two input switches SW3 and SW4 rotate in opposite directions at a speed of $\omega_1=2\pi f_1$ and the two input signals are band limited by the low pass filter units 7 so that $0<f<f_1$ and in this mode there appears at the output a signal composed of one input translated erect below $f_2$ and one input translated inverted above $f_2$ as shown in the drawing according to FIG. 7. The broadband filter unit 6 situated between the rotary switch SW2 and the output being arranged to reject all other output frequency components.

It should be noted that the earthing of the input modulators is omitted from the drawing according to FIG. 6 for clarity.

Figure 8:
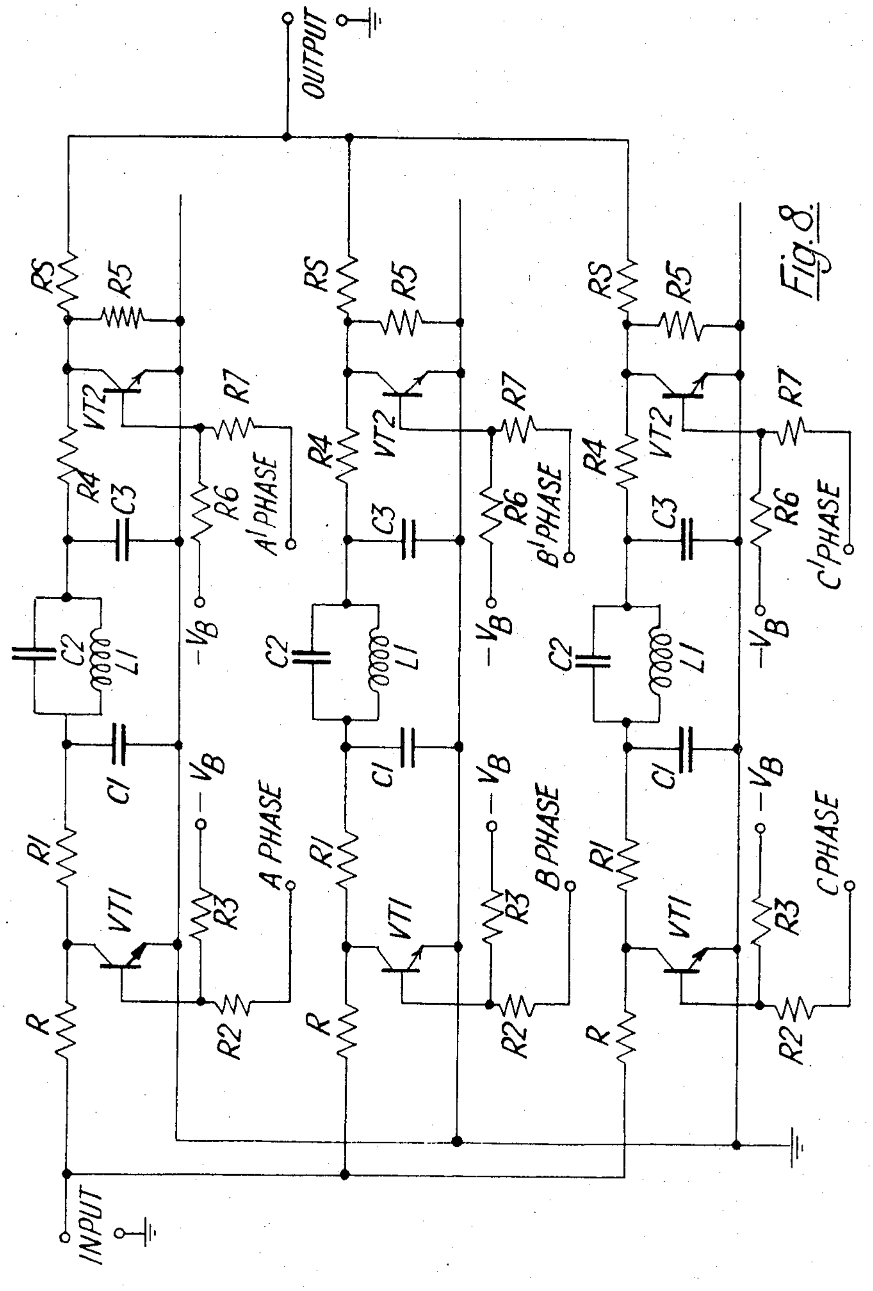
FIG. 8 shows a practical circuit diagram of a three path frequency translation system.

Referring to FIG. 8 a practical circuit diagram of a three path configuration of a frequency translation system is shown and comprises in each of the three paths an input modulator unit, a low pass filter unit and an output modulator unit.

Each of the three paths therefore comprise a transistor VT1, the base of which is connected to a negative bias supply $V_B$ via a resistance R3 and also to the modulator frequency input (A, B or C phase) terminal via a resistance R2. The emitter of the transistor VT1 is connected to earth potential whilst the collector is connected via a resistance R to the system input terminal and also via a resistance R1 to one side of a capacitance C1 which shunts the transistor VT1. The other side of capacitance C1 being connected to earth potential. A capacitance C2 which is shunted by an inductance L1 is connected at one end to the collector of the transistor VT1 via the resistance R1 and at the other end to the collector of the transistor VT2 via a resistance R4. A capacitance C3 which shunts the transistor VT2 is connected between earth potential and the junction of the capacitance C2 and resistance R4. The collector of the transistor VT2 is also connected to the output terminal via a resistance RS and to the emitter of the transistor VT2 at earth potential via a resistance R5.

The base of the transistor VT2 is connected to a negative bias supply $V_B$ via a resistance R6 and also to the demodulator frequency input (A′, B′ or C′ phase) terminal via a resistance R7.

The output of each of the three paths are summed by the action of the resistance RS shown in the drawing according to FIG. 8.

Since at any time two of the input transistors are an effective short circuit, the signal passing through the remaining path and its associated resistance RS will therefore be developed across a load of one-half RS since the other two resistances RS will have one end grounded by way of their respective short circuited transistors.

The low pass filter units shown in the drawing according to FIG. 8 each of which comprises capacitance C1 to C3 and inductance L1 is only a single section but it could be and in fact in practice would be a more complex filter unit.

Considering one of the three paths, the transistor VT1 either shorts the input path to earth potential when conducting or allows the signal to pass through to the low pass filter unit when it is inoperative and an effective open circuit. The input to the base of the transistors VT1 is represented by the waveform illustrated as phase A in the drawing according to FIG. 9 and when this waveform switches from zero to three volts positive the transistor VT1 will be driven into conduction and will therefore become a short circuit, all of the input voltage being dropped across the input resistance R. When the waveform switches back to zero the transistor VT1 will become open circuit and therefore the input signal will be passed through to the low pass filter unit 2.

Since this is a three path system the transistor VT1 will be in conduction for two-thirds of the complete cycle time (T) and the signal allowed to pass through each channel in turn for one third of the complete cycle time. In an N-path system the transistor VT1 would be in conduction for a period of (N−1) T/N, and the signal allowed to pass through each channel in turn for a period of T/N.

The transistor VT1 output resistance R1 acts as a buffer resistance to the low pass filter unit. The low pass filter unit sees a fairly constant impedance all the time and therefore the theoretical response of the low a pass filter unit is obtained. The low pass filter in this case (three paths) actually sees a source of impedance 1⅓rd R, the low pass filter unit being designed to operate at this impedance. In an N path system the source of impedance would be $$1\frac{1}{N}R$$

The negative bias $V_B$ which is applied to the base of the transistors VT1 and VT2 makes the base potential negative with respect to the emitter when the wave form switches from a positive potential to zero, thereby causing the transistors VT1 and VT2 to go open circuit immediately and even if the collectors of the transistors VT1 and VT2 go negative with respect to the emitters no current will flow through the transistors. If the negative bias were omitted, the emitters would become the collectors and vice versa.

The transistors VT2 operate exactly as outlined for the transistors VT1, the voltage again being chopped and sampled, the output signal will appear across the resistance R5 and will finally pass to the summation unit which comprises the resistance RS.

When the input band of frequencies to the translation system is 0 to $2f_1$, since $f_1$ is the frequency of the input modulator, the input band to a three path system must be limited to 0 to $f_1$ otherwise unwanted components would appear in the output circuit.

Figure 10:
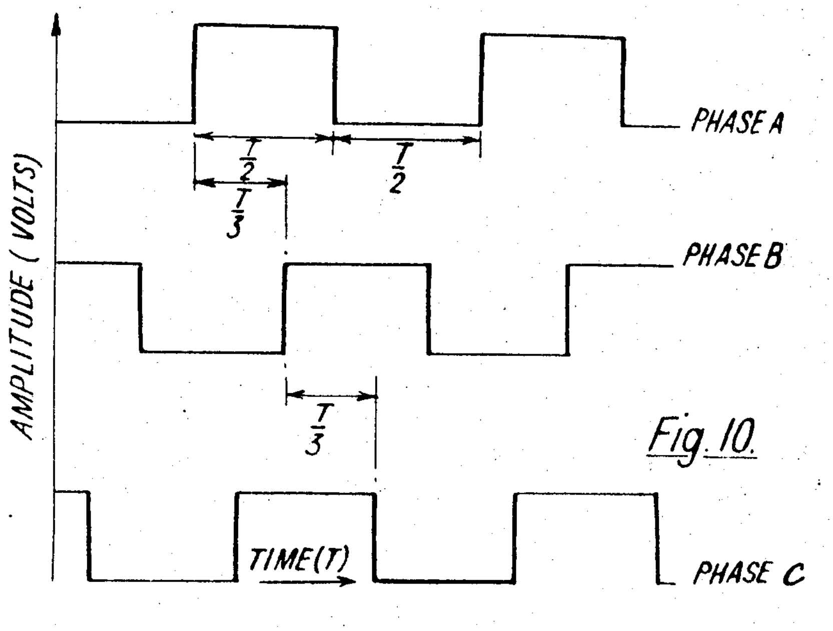
FIG. 10 shows the waveforms of each of the input signals to the three input modulator circuits shown in the drawing according to FIG. 8 when the input band of frequencies to the system is 0 to $2f_1$.

However, if it is required to use the full input frequency range of 0 to $2f_1$ then a four path system must be used or alternatively the input signal (A, B and C phases) applied to the base of the transistors VT1 (shown in the drawing according to FIG. 8) must be as shown in the drawing according to FIG. 10.

Referring to FIG. 10, each of the waveforms is again delayed by a period of T/3 (in an N-path system this would be for a period of T/N) but the waveform is symmetrical thus the unwanted component is eliminated. Only the old harmonics will be present in this waveform.

The reasons for these modifications when a 0 to $2f_1$ range of input frequencies is applied to the system is due to a signal being developed at the output of $f_2 + 2f_1 - f$. This signal is generated by the second harmonic of the waveform which has a frequency equal to the difference between the frequency $f_1$ of the input signal applied to the input modulator and the frequency $f_1$ of the input signal to the system.

Thus, if one of the methods outlined is adopted then the unwanted component will be automatically suppressed.

There are a considerable number of practical advantages in the method of single sideband generation as outlined in the preceding paragraphs and these are outlined below.

Any unwanted products of modulation appear within the band of the wanted signal rather than in adjacent bands as with other systems. This is a distortion of the signal itself and therefore a greater error can be allowed than if it were crosstalk into an adjacent channel. (In general some distortion will always occur since zero distortion requires that all the paths be identical.)

The same system will translate the desired input band (s) either erect or inverted to any other specified band (s) all that is necessary is to adjust the switching sequence and the switching rate.

The process is reversible, i.e., one can translate an erect or an inverted sideband back to audio. It has been assumed in the analysis that $f_2 > f_1$ (or $\omega_2 > \omega_1$ and $p_2 > p_1$). To reverse the process it is only necessary to interchange suffixes 1 and 2 on the above variables in the mathematical argument.

The technique lends itself to solid state miniaturisation as all the elements including the low pass filters may be realized with resistance, capacitance and semiconductors or equivalent devices. This may have considerable importance in the future as integrated circuitry becomes cheaper.

There can be many variations on the basic theme including:

a. More than one modulator at the input and or output;
b. As above with modulators rotating at different rates and in different directions;
c. The rotation of the modulator switches might be frequency or phase modulated, (Possibly even by the incoming signal);
d. If the networks are connected to the input modulator in a certain sequence they might be connected to the output modulator in some other sequence, i.e., some form of coding;
e. The networks shown as low pass filters may be band pass, band stop or high pass filters; and f. A common input modulator could be used and from each switch contact there could diverge more than one network path leading to different output modulators.

Similarly with the output modulator, it is to be understood that the foregoing description of specific examples of this invention is made by way of example only and is not to be considered as a limitation on its scope.

We claim:

1. A frequency translation system having N-paths which are identical and connected in parallel, each of said paths comprising at least one input modulator unit coupled to an input, said input modulator units including input transistor networks, a filter unit and at least one output modulator unit coupled to an output, said modulators sampling in turn a given input frequency spectrum for a period of time determined by N, said input and output modulator units being unbalanced to provide single sideband generation of signals, the outputs of each of said paths being connected to a summation unit the output frequency spectrum of which are either an erect or inverted translation of said input frequency spectrum.

2. A frequency translation system as claimed in claim 1 wherein said input frequency spectrum is band limited by providing a second filter unit which is interposed between said input and said input modulator units.

3. A frequency translation system as claimed in claim 1 wherein N is determined by said output frequency spectrum bandwidth.

4. A frequency translation system as claimed in claim 2 wherein said output frequency spectrum is band limited by providing a third filter unit which is interposed between said output and said output modulator units.

5. A frequency translation system as claimed in claim 4 wherein said filter units in each of said paths are provided by low pass filter units.

6. A frequency translation system as claimed in claim 5 wherein said low pass filter units each comprise a first capacitance connected in parallel with an inductance between the input and output terminals of said low pass filter unit, a second capacitance connected between said filter input terminal and earth potential, and a third capacitance connected between said filter output terminal and earth potential.

7. A frequency translation system as claimed in claim 1 wherein said output modulator unit is provided by an N-pole, N-way rotary output sampling switch.

8. A frequency translation system as claimed in claim 1 wherein each of said input transistor networks comprises a transistor having its emitter connected to earth potential, its base connected to a negative supply line via a first resistance and to a source of modulating signal via a second resistance, and its collector connected to the filter unit via a third resistance.

9. A frequency translation system as claimed in claim 1 wherein said output modulator units in each of said paths are provided by output transistor networks.

10. A frequency translation system as claimed in claim 9 wherein each of said output transistor networks comprises a transistor having its emitter connected to earth potential, its base connected to said negative supply line via a fifth resistance and to a source of modulating signal via a sixth resistance, and its collector connected to an output via a seventh resistance.

11. A frequency translation system as claimed in claim 10 wherein said summation unit includes a resistance in each of said paths which is connected to the output of the respective output transistor network.

12. A frequency translation system having N-paths which are identical and connected in parallel, each of said paths comprising at least one input modulator unit coupled to an input, each said input modulator unit including an N-Pole and N-way rotary output sampling switch, a filter unit and at least one output modulator unit coupled to an output, said modulators sampling in turn a given input frequency spectrum for a period of time determined by N, said input and output modulator units being unbalanced to provide single sideband generation of signals, the outputs of each of said paths being connected to a summation unit the output frequency spectrum of which are either an erect or inverted translation of said input frequency spectrum.

13. A frequency translation system as claimed in claim 12 wherein an erect translation of said input frequency spectrum is provided at the output of said frequency translation system when said N-pole, N-way rotary input and output sampling switches are rotated in the same direction.

14. A frequency translation system as claimed in claim 12 wherein an inverted translation of said input frequency spectrum is provided at the output of said frequency translation system when said N-pole, N-way rotary input and output sampling switches are rotated in the opposite direction.

15. A frequency translation system as claimed in claim 12 wherein said input modulator units are duplicated and provided by two N-pole, N-way rotary input sampling switching, said N-pole, N-way rotary input sampling switches being rotated in opposite directions to provide output frequency spectrums which are an erect and inverted translation of said input frequency spectrum.